April 5, 1927.  I. H. ATHEY  1,623,456
VEHICLE
Filed Feb. 1, 1923
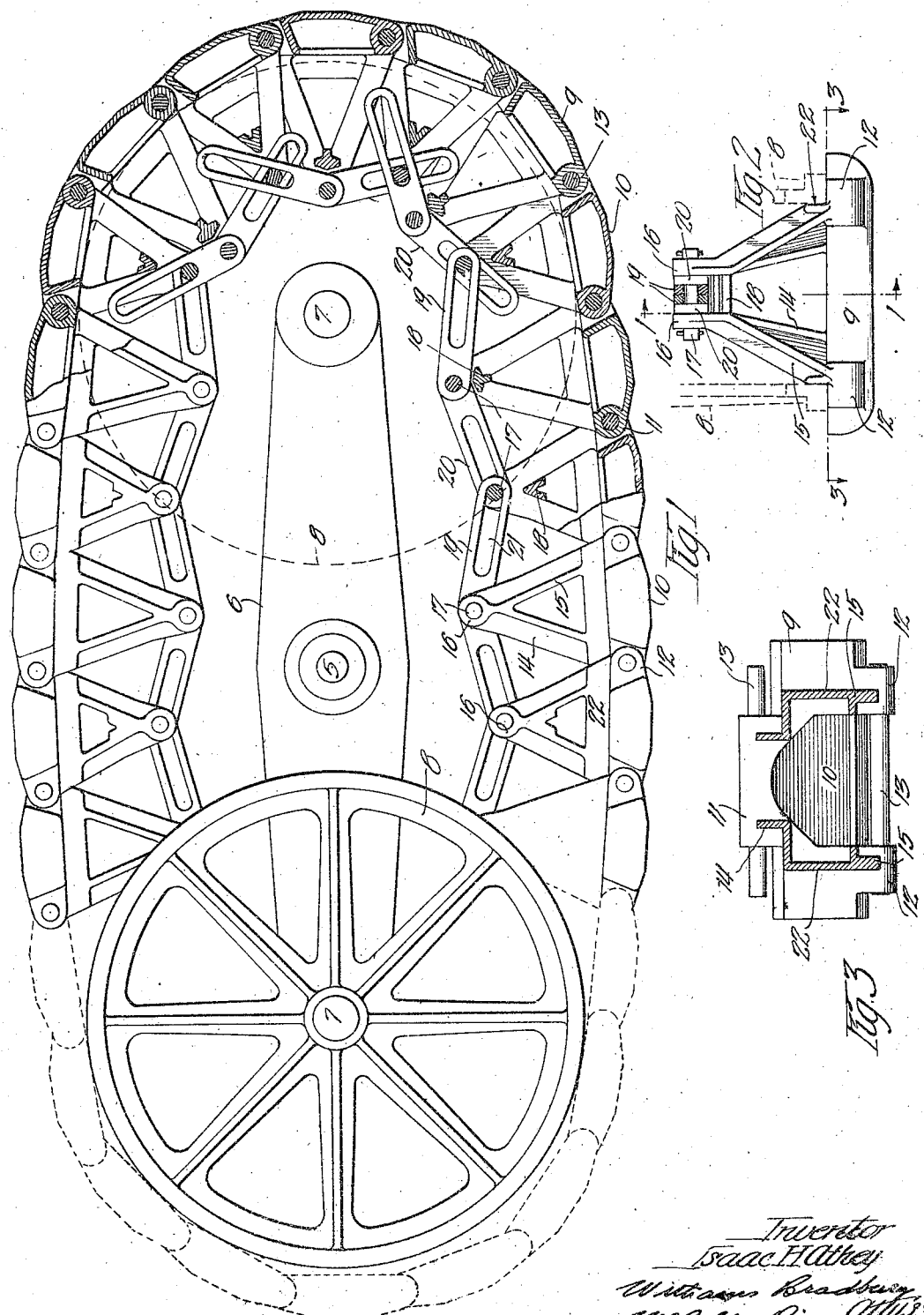

Patented Apr. 5, 1927.

1,623,456

UNITED STATES PATENT OFFICE.

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS.

VEHICLE.

BEST AVAILABLE COPY

Application filed February 1, 1923. Serial No. 616,404.

My invention relates to improvements in vehicles, and is particularly concerned with improvements in vehicles of the track-laying type in which a flexible track passes about and supports the load-carrying wheels.

The objects of my invention are:

First. To provide a vehicle of the character described comprising a flexible track formed of a plurality of links or shoes, the adjacent edges of which are pivotally connected together to form a continuous band passing around the load-supporting wheels, the links or shoes having inwardly projecting truss arms, each of which is connected with the truss arms on the adjacent links or shoes by links which prevent the inner ends of the truss arms from separating more than a predetermined distance and thus provide a rigid reach of track upon which the load-supporting wheels roll.

Second. To provide a vehicle comprising a track of the character described in which the truss arms and the truss links are so arranged as to fold compactly together where the track chain passes around the load-supporting wheels.

Third. To provide a track chain of the character described in which the arrangement of the truss arms and the truss links is such that the movement of the truss links, when they are assuming their trussing position and when they are assuming their collapsed position, will be one of gradual acceleration and deceleration, so as to relieve the links themselves and their pivotal connections, as well as other portions of the track, from the sudden stresses which are imposed thereon in tracks of this character in which a different type of trussing construction is employed; and Fourth. To provide a construction of the character described which is simple in construction, efficient in operation and economical to manufacture, and which, at the same time, provides a maximum amount of strength with a minimum amount of material.

Other objects of my invention will appear as this description progresses, reference being had to the accompanying drawings, in which—

Figure 1 is a side elevation of a vehicle embodying my invention, portions of the track being broken away along a line corresponding to line 1—1 of Figure 2;

Figure 2 is an end elevation of one of the links or shoes forming my improved track chain; and Figure 3 is a horizontal section taken on line 3—3 of Figure 2.

Throughout the several views, similar reference characters will be used for referring to similar parts.

Referring to the drawings, I have illustrated my invention in connection with a vehicle which comprises an axle 5 for supporting the load-carrying frame (not shown). A beam 6 is pivotally mounted upon the axle 5 and carries a shaft 7 at each end thereof. The ends of these shafts project from opposite sides of the beam 6 and each shaft carries a pair of load-supporting wheels 8, which roll upon the track about to be described. It will, of course, be understood that the opposite end of the axle 5 carries a beam 6, upon the end of which is mounted a pair of wheels 8 and a track similar to the one shown in Figure 1.

Each of the tracks embodied in my improved vehicle comprises a plurality of links or shoes preferably formed from a channel shaped casting 9, the bottom 10 of which is adapted to engage the earth. A hinge lug or bearing block 11 projects from one side of each shoe and a pair of hinge lugs or bearing blocks 12 project from the opposite side of each shoe and are spaced apart sufficiently to receive the hinge lug 11 of the adjacent shoe. Pintles 13, extending through the hinge lug 11 of one shoe and the hinge lugs 12 of the next adjacent shoe, provide means for pivotally interconnecting the adjacent shoes to form an endless track for the load supporting wheels. The ends of the shoes provide parallel endless treads for the rims of each pair of wheels 8 as shown most clearly in Fig. 2. The pintles 13 may be rotatably mounted in either the lugs 11 or 12 or in both of them, as may be desired. A truss arm 14 L shaped in cross section extends inwardly from a point adjacent each end of one side of each shoe, and a similarly shaped truss arm 15 projects inwardly from a point adjacent each end of the other side of the shoe, these arms being spaced apart further than the arms 14, as clearly shown in Figures 2 and 3. Each pair of arms 14 and 15 converge toward each other and toward the corresponding pair of arms at the other end of the shoe. Each pair of arms 14 and 15 are integrally joined at their upper ends to provide a bearing 16 for the pivot pins 17. A tie 18, formed integrally with the inner ends of the two pairs of truss arms, connects the truss arms adjacent their inner ends.

Ribs or flanges 22, extending across each end of each shoe between the lower end of each pair of truss arms 14 and 15, provide means for engaging the rims of the load-supporting wheels 8 and automatically centers the shoes with respect to each pair of load-supporting wheels.

From an inspection of Figure 1, it will be seen that the truss arms of alternate shoes are shorter than the truss arms of the remaining shoes, but otherwise their construction is substantially the same.

For trussing together the inner ends of the truss arms, I provide each of the shoes having the longer truss arms with two pairs 19 and 20, respectively, of truss links, which are pivotally mounted upon the pivot pin 17 with the respective links of the last-mentioned pair lying outside of the pair 19 (see Figures 1 and 2). The other ends of both pairs of links are provided with longitudinally extending slots 21 for receiving the pivot pin 17 of the adjacent shorter truss arms, as shown in Figure 1.

From an inspection of Figure 1, it will be seen that by making the truss arms of alternate shoes shorter than the truss arms of the remaining shoes, the truss arms of the links passing around a wheel can fold together much more compactly than would be possible if the truss arms were of equal length. It will also be apparent that by making alternate truss arms shorter than the remaining truss arms, the truss links are given an initial deflection, which prevents the ends of the truss links from engaging the inner ends or heads of adjacent links when the truss links are collapsed as shown at the right-hand end of Figure 1. Furthermore the truss links are always caused to fold or collapse outwardly during the passage of the shoes around the load supporting wheels and interference and locking on dead centers are thereby prevented. Another advantage which results from the construction just described is that, when the shoes begin to fold around one of the load-supporting wheels, the initial movement of the slotted ends of the truss links is comparatively slow and gradually accelerates and then as gradually decelerates, so that, during this movement, there is no snap or whip action of the links which is present in some types of truss chains in vehicles of this character. The same comment applies to the movement of the truss chain links when the shoes are straightened out to receive the load-supporting wheels. In this case also the movement of the truss links gradually accelerates and then decelerates in the same manner.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A track chain for a vehicle comprising a plurality of shoes, each having a tread member, the edges of the adjacent tread members being pivotally connected, a truss arm extending inwardly from each side of each end of said shoes, said arms converging toward each other and being secured together at their inner ends, the arms on alternate shoes being shorter than the arms on the other shoes, a horizontally extending pivot pin carried by the inner ends of the truss arms of each shoe, and truss links connecting the pin of each shoe with the pins of the adjacent shoes, said links having longitudinally extending slots formed therein for receiving the pins on the shorter truss arms.

2. A track chain for a vehicle comprising a plurality of shoes, each having a tread member, the edges of the adjacent tread members being pivotally connected, a truss arm extending inwardly from each tread member, the truss arms on alternate tread members being shorter than the truss arms on the remaining tread members, a pivot pin carried by each truss arm and truss links pivotally mounted on the pins carried by the longer truss arms and having longitudinally extending slots for receiving the pins on said shorter truss arms.

3. A track chain for a vehicle including a plurality of shoes, each comprising a tread member, the adjacent edges of said tread members being pivotally connected, a truss arm extending inwardly from each tread member, the truss arms on alternate tread members being shorter than the truss arms on the remaining tread members, and collapsible means for connecting the inner ends of adjacent truss arms.

4. A track chain for a vehicle including a plurality of shoes each comprising a tread member, the adjacent edges of said tread members being pivotally connected, a truss arm extending inwardly from each tread member, the truss arms on alternate tread members being shorter than the truss arms on the remaining tread members.

5. A track chain for a vehicle, comprising a series of tread shoes pivotally interconnected to form an endless, flexible track for sustaining the load, a truss arm extending inwardly from each shoe, the truss arms being alternately relatively long and short, and interconnections between the truss arms to permit the arms to fold together and limit their separation.

In witness whereof, I hereunto subscribe my name this 10th day of January, 1923.

ISAAC H. ATHEY.